United States Patent Office 3,527,955
Patented Sept. 8, 1970

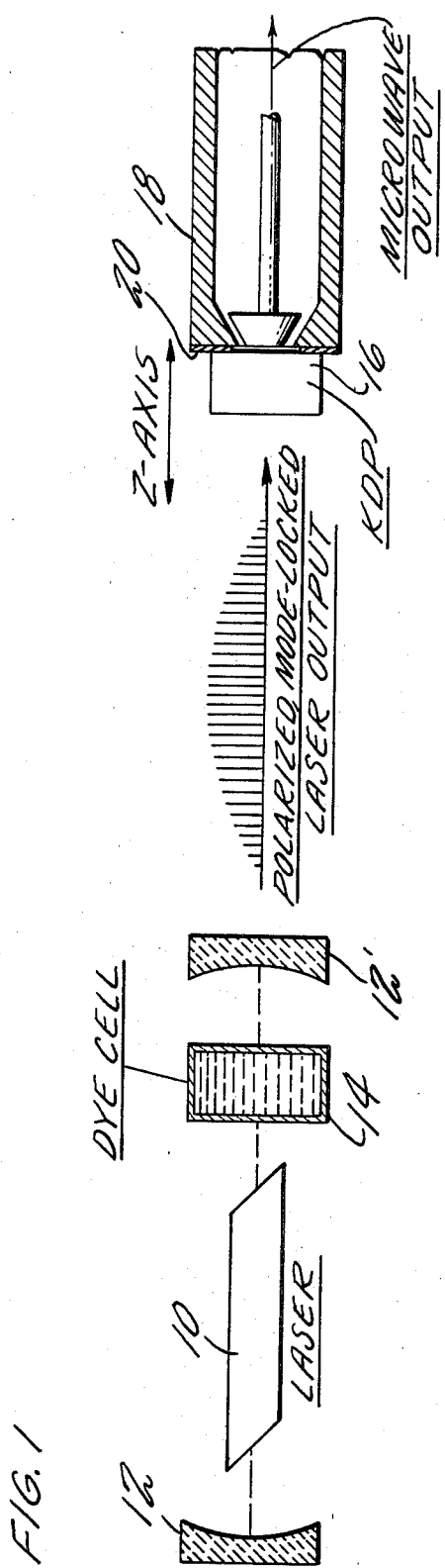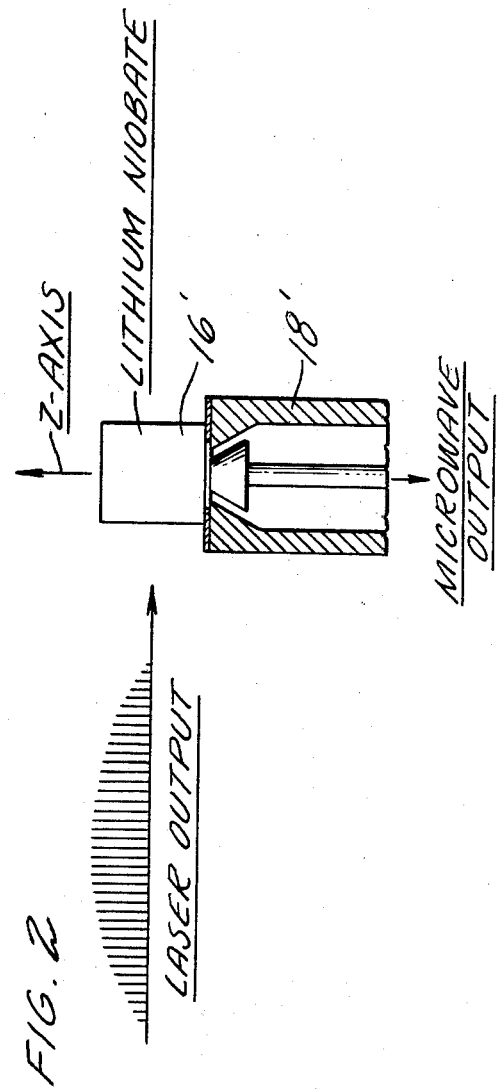

3,527,955
MICROWAVE GENERATOR USING LASER PULSES
Michael J. Brienza, Vernon, and Anthony J. Demaria, West Hartford, Conn., assignors to United Aircraft Corporation, East Hartford, Conn., a corporation of Delaware
Filed May 15, 1968, Ser. No. 729,303
Int. Cl. H03f 7/00
U.S. Cl. 307—88.3         4 Claims

ABSTRACT OF THE DISCLOSURE

Electromagnetic waves of discrete microwave frequencies are generated by the irradiation of an optically nonlinear material with uniformly spaced, ultrashort optical pulses produced by a mode-locked laser. The microwave signals are generated by the optical rectification of the laser pulse train, and are harmonically related to the laser pulse train in frequency, the fundamental frequency being specified by the repetition rate of the laser pulses.

BACKGROUND OF THE INVENTION

This invention relates to the generation of microwave signals of discrete frequencies, and in particular to the generation of microwave signals by the irradiation of an optically nonlinear material with the uniformly spaced, ultrashort pulses of a Q-switched mode-locked laser.

The output of a mode-locked laser consists of a series of pulses, each of which is of the order of a few picoseconds long, spaced by a fixed time determined by twice the optical length of the cavity, typically a few nanoseconds. When the mode-locked optical pulses irradiate an optically nonlinear material such as lithium niobate having an induced polarization which is dependent on the square of the irradiating electric field, a microwave pulse is produced which duplicates the envelope of the optical pulse. For the entire train of laser pulses a corresponding train of microwave pulses is produced.

The desirability of generating high frequency microwave pulses is readily apparent. The response time of the optical material extends from zero c.p.s. up into the optical region, and is thus the largest bandwidth phenomenon available. It therefore has obvious important applications in the generation and detection of extremely high frequency signals.

SUMMARY OF THE INVENTION

An object of this invention is a novel apparatus and method for generating high frequency microwave pulses.

Another object of this invention is a microwave signal generator utilizing mode-locked laser pulses.

A further object of this invention is a microwave electronic signal generator in which there are no electrical input connections.

Another object of this invention is a microwave signal generator of uniform, broad-band operation in which a nonlinear optical element is irradiated by optical pulses from a mod-locked laser, the frequency of the microwave signal being variable as a function of the optical geometery of the laser.

In accordance with this invention the output of a laser is mode or phase locked by any well known means such as the insertion of a saturable absorber or bleachable dye in the laser optical feedback cavity. Mode-locking produces a series of evenly spaced pulses in a pulse train. The laser pulse train is made to impinge on a nonlinear optical crystal such as quartz, lithium niobate or KDP. The nonlinear crystals have an induced polarization which depends on the square of the irradiating electric field.

The nonlinear crystal, when irradiated by the laser pulse train, will produce a series of DC pulses along one or more axes thereof and if properly oriented, a series of second harmonic light pulses. The DC pulses duplicate the envelope of the laser pulses, and have their fundamental component fixed by the repetition rate of the laser pulses, with their harmonic content limited by the inverse pulse width of the laser pulses.

The microwave generator of this invention is a completely passive element in which very high frequencies are available due to the very high harmonic content of the optical pulse train. No physical limitations are imposed by the nonlinear crystal element itself, and very precise frequencies can be specified. Furthermore, no electrical connections are required for the system in which the microwave signals are to be generated, thereby permitting the generation of such signals in environments or circumstances in which it would be difficult or impossible to obtain such signals using prior art devices.

The microwave generator provides uniform, broad-band operation merely by changing the optical cavity length of the laser. The system may also be used as an ultrafast laser detector.

DESCRIPTION OF THE DRAWING

FIG. 1 shows schematically a mode-locked laser irradiating a KDP crystal to produce microwave pulses.

FIG. 2 shows schematically a modification of FIG. 1 in which a lithium niobate crystal is utilized.

DESCRIPTION OF THE PREFERRED EMBODIMENT

Referring to FIG. 1, there is shown a mode-locked laser having an optical feedback cavity defined by reflecting end mirrors 12 and 12'. The laser 10 may be Nd:glass, ruby, Nd:YAG or other well known type of laser capable of generating a series of uniformly spaced, ultrashort light pulses of the amplitude required. The laser may be a CW laser such as Nd:YAG, or Q-switching apparatus may be used to produce a pulse train of finite duration as from a Nd:glass. The usual pumping apparatus and power supplies necessary for laser operation are not shown.

Mode-locking of lasers is well known. Mode-locking may be accomplished by the use of dye cells, or by acoustic waves, to lock in phase the oscillations of the axial modes of the laser cavity. A dye cell 14 is shown positioned in the laser feedback cavity to accomplish the mode-locking. One method for mode-locking a laser is described in copending application Ser. No. 552,315 entitled "Laser Pulse Shaping Using Acoustic Waves," filed May 23, 1966 by Anthony J. De Maria and assigned to the same assignee.

The mode-locked laser is actuated to produce a series of light pulses, for example of $10^{-11}$ to $10^{-12}$ seconds time duration, evenly spaced by the optical circulation time of the laser feedback cavity. Typical pulse trains exhibit a spacing of approximately 5 nanoseconds, representing a pulsing rate of 200 mHz. The average energy in a single pulse is typically of the order of one millijoule, and an entire pulse train contains from 100 to 150 individual pulses, lasting about 0.4 to 0.6 $\mu$sec.

The mode-locked pulse train from the laser is directed to impinge upon an optical nonlinear crystal of the class including quartz, KDP (potassium dihydrogen phosphate) and lithium niobate. As shown in FIG. 1, a KDP crystal 16 is positioned with its Z axis parallel to the laser pulse train. A coaxial microwave output cable 18 is positioned adjacent crystal 16 on the face opposite that on which the laser pulses impinge, and the microwave electromagnetic waves generated in the crystal are fed through cable 18 to an output terminal.

In FIG. 2 the crystal 16' is lithium niobate. The laser beam is directed perpendicular to the Z axis of the crystal, and the microwave signal is propagated through coaxial probe 18' positioned on a crystal face normal to the Z axis.

Acoustic signals are eliminated if necessary by optically shielding the crystal faces normal to the Z axis, shown in FIG. 1 as an annular gasket 20 between the crystal 16 and coaxial probe 18. Such acoustic signals would be converted to electrical signals at the surface of probe 18 by the piezoelectric properties of the surface of crystal 16, and may be undesirable in some applications.

The microwave signals are generated by the optical rectification of the laser pulse train. The response time of the optical rectification effect extends from zero c.p.s. up into the optical region, and is an exceptionally wide bandwidth phenomenon.

The optical nonlinear crystal irradiated by the laser pulse train has an induced polarization $P_2$ which depends on the square of the electric field present. Thus $$P_2 = \chi \epsilon^2$$

where $\chi$ is the nonlinear optical polarizability of the crystal and $P_2$ is the polarization resulting from the second order term in a power series expansion of the polarization in terms of the electric field $\epsilon$. If the electric field is of the form $\epsilon = \epsilon_0 \sin wt$, that is, a time varying field, then $P_2$ is given by $$P_2 = \chi \epsilon_0^2 \sin^2 wt = [\chi \epsilon_0^2 / 2](1 - \cos 2wt).$$

The $\cos 2wt$ term gives rise to the second harmonic light, while the unit term within the brackets corresponds to a DC polarization within the crystal which arises from the quadratic nonlinearity in much the same way as DC currents are produced in the square law detectors of radio frequency practice.

Thus, for each laser pulse a corresponding DC signal is produced which duplicates the envelope of the laser pulse. For the entire pulse train a corresponding train of microwave "DC" pulses is produced. The optical signal is literally square law detected. The resulting signal has its fundamental component fixed by the repetition rate of the pulses and the harmonic content is limited by the inverse pulse width. Since the individual laser pulse durations may be made quite small, microwave signals into the millimeter region may be generated with the pulses available from mode-locked lasers. The ultimate frequency available is limited only by the width of the individual laser pulses.

Since the DC term in the last equation has no phase matching requirement, the DC term is present whether or not the crystal is properly oriented for efficient production of second harmonic light. However, since the phase matching angle for second harmonic light generation in lithium niobate by a Nd:glass laser is very close to 90° from the Z axis, the crystal is phase matched in the configuration of FIG. 2, and second harmonic light is produced. Thus, by observation of the green second harmonic light from the crystal, and by simultaneously monitoring the microwave signal produced by the DC component, it is apparent that the microwave signals are a result of the nonlinear properties of the crystal since the envelopes of the second harmonic light and microwave signals match. It is not sufficient to prove this phenomenon merely to observe the envelope of the laser output, because $P_2$ depends on the power ($\epsilon^2$) of the laser signal, and the power will be changed by variations in the pulse width of the laser pulses during the pulse train. Any pulse width variations would be beyond the capabilities of photo detectors to observe, so that the observed envelope of the laser pulse train need not be similar to the observed envelope of the nonlinear signals, i.e., the microwave signal and the green light.

By monitoring a KDP crystal as in FIG. 1, with the laser pulses incident along the Z axis and a gasket positioned at the crystal-probe interface to eliminate acoustic wave generation, it may be convincingly shown that the microwave signals are of a nonlinear origin. By mounting the crystal so that the angle $\chi$ between the $x$ or $y$ axes of the crystal and the plane of polarization of the incident light may be varied, and observing the microwave signal as the crystal is rotated, the observed signal traces out a curve identical to the $\sin 2\chi$, thus conclusively showning that the microwave signal originates from optical rectification.

While the system described herein has shown coaxial types of microwave coupling devices to detect the signals produced, these signals can be appropriately coupled into standard microwave wave guide structures. There are many other methods well known in the prior art of microwave techniques which can be used to couple microwave energy from microwave source for the purposes of detection or further use.

Although this invention has been shown and described with respect to the preferred embodiments thereof, it is understood that numerous changes may be made without departing from the scope of this invention, which is to be limited and defined only by the following claims.

We claim:
1. Apparatus for generating high frequency electromagnetic waves of microwave frequencies comprising;
   means for generating a train of longitudinally mode-locked optical pulses,
   a nonlinear reactive optical crystal of the class comprising quartz, KDP and lithium niobate,
   means for irradiating said optical crystal with said optical pulse train,
   and microwave transmitting means positioned in contact with a face of said optical crystal which is normal to the Z axis thereof for transmitting said microwave electromagnetic waves to an output terminal.

2. Apparatus as in claim 1 in which said optical crystal is KDP, and in which said optical crystal is oriented with its Z axis parallel to said optical pulse train.

3. Apparatus as in claim 1 in which said optical crystal is lithium niobate, and in which said optical crystal is oriented with its Z axis perpendicular to said optical pulse train.

4. Apparatus as in claim 1 and including an annular gasket positioned between said optical crystal and said microwave transmitting means.

No references cited.

ROY LAKE, Primary Examiner

D. R. HOSTETTER, Assistant Examiner

U.S. Cl. X.R.

321—69